United States Patent [19]

Ito et al.

[11] Patent Number: 4,785,053

[45] Date of Patent: Nov. 15, 1988

[54] OPTICAL RESIN MATERIAL HAVING IMPROVED BIREFRINGENCE

[75] Inventors: Iko Ito; Shozaburo Imai; Michihisa Isobe, all of Niihama, Japan

[73] Assignee: Sumitomo Chemical Company, Limited, Osaka, Japan

[21] Appl. No.: 885,566

[22] PCT Filed: Nov. 1, 1985

[86] PCT No.: PCT/JP85/00607

§ 371 Date: Jul. 2, 1986

§ 102(e) Date: Jul. 2, 1986

[87] PCT Pub. No.: WO86/02653

PCT Pub. Date: May 9, 1986

[30] Foreign Application Priority Data

Nov. 2, 1984 [JP] Japan .................... 59-232185

[51] Int. Cl.$^4$ .......................... C08L 69/00

[52] U.S. Cl. ................ 525/146; 525/100; 525/103; 525/165; 525/175; 525/182; 525/189; 525/217; 525/308; 525/468; 525/474; 525/479; 526/262

[58] Field of Search ............ 525/359.3, 146, 468, 525/100, 103, 308, 474, 479, 165, 175, 182, 189, 217; 526/262

[56] References Cited

U.S. PATENT DOCUMENTS

| | | | |
|---|---|---|---|
| 4,196,276 | 4/1980 | Schreckenberg et al. | 528/176 |
| 4,319,003 | 3/1982 | Gardlund | 525/148 |
| 4,373,065 | 2/1983 | Prest, Jr. | 525/132 |
| 4,495,345 | 1/1985 | Kawakami et al. | 528/372 |

FOREIGN PATENT DOCUMENTS

| | | |
|---|---|---|
| 0089801 | 9/1983 | European Pat. Off. |
| 0177713 | 4/1986 | European Pat. Off. |
| 088843 | 5/1983 | Japan |
| 1182807 | 3/1970 | United Kingdom |

OTHER PUBLICATIONS

Patent Abstracts of Japan, vol. 10, No. 38 (P-428) [2095], Feb. 14, 1986, Matsushita Denko K.K.

*Primary Examiner*—Theodore E. Pertilla
*Attorney, Agent, or Firm*—Birch, Stewart, Kolasch & Birch

[57] ABSTRACT

An optical resin material comprising at least two constituent units each having positive and negative main polarizability differences of at least $50 \times 10^{-25}$ cm$^3$ in terms of absolute values has small birefringence and good water absorbance, heat resistance and moldability.

8 Claims, No Drawings

OPTICAL RESIN MATERIAL HAVING IMPROVED BIREFRINGENCE

FIELD OF THE INVENTION

The present invention relates to an optical resin material with good birefringence. More particularly, it relates to a resin material suitable as a material of an optical recording substrate for optically recording and reproducing video information and the like.

PRIOR ARTS

Recently, a system for reproducing images and sounds by detecting informations recorded in the form of minute irregularities formed on a disc substrate by means of laser beam spot and a system for high density recording and reproducing of informations through change of optical properties of a recording film applied on a surface of a substrate attract attention has been developed.

The disc substrate used in such recording and reproducing systems is required to have not only transparency but also such properties as dimensional stability, optical homogeneity and a small birefringence. Although plenty of duplicated disc substrates can be economically produced by using the resin material as a material of the disc substrate, it is widely recognized that the resin flows during molding of the disc substrate and molecules are oriented during cooling so that birefringence is induced. Optical anisotropy caused by birefringence is a fatal defect for the optical disc substrate.

The molecular orientation caused during molding is inevitable particularly in injection molding. From these points of view, a polymer comprising methyl methacrylate is the only resin material with little optical anisotropy.

When the hiterto known polymer comprising methyl methacrylate is used as the substrate material, it lacks dimensional stability due to its large hygroscopicity so that it has the drawback in that it wraps and twists in a humid atmosphere. Such a drawback is described in detail in Nikkei Elctronics, page 133 (published on June 7, 1982). Therefore, as a material for an acoustic compact disc, used is an aromatic polycarbonate resin with low hygroscopicity.

Since the aromatic polycarbonate resin contains atomatic rings with large anisotropy in its backbone chain, it is difficult to reduce birefringence of the molded substrate. To solve such problems, molding conditions including decreases in molecular weight are being investigated. However, since birefringence of the substrate originates from the material itself, it is impossible to constantly produce substrates with small birefrigence and it is very difficult to produce a substrate with small birefringence, having a diameter larger than that of the acoustic compact disc, by injection molding.

To improve dimensional stability, which is a drawback of the polymer comprising methyl methacrylate, copolymers comprising methyl methacrylate and aromatic vinyl monomer are proposed in Japanese Patent Kokai Publication (unexamined) Nos. 33446/1982, 162135/1982 and 88843/1983. The copolymer comprising methyl methacrylate and an aromatic vinyl monomer tends to induce birefringence and cannot be practically used.

Further, Japanese Patent Kokai Publication (unexamined) Nos. 5318/1983 and 127754/1983 propose copolymers of methyl methacrylate and cyclohexyl methacrylate for reducing hygroscopicity without deteriorating the birefringence. Since cyclohexyl methacrylate should be copolymerized in an amount larger than the aromatic vinyl monomer to decrease the hygroscopicity of the copolymer, the copolymer suffers from deterioration of heat resistance and strength.

For the disc substrate which is used not only for reproducing but also recording of informations, a material is required to have better birefringence and dimensional stability. However, any known resin material does not satisfy these requirements.

DETAILED DESCRIPTION OF THE INVENTION

One object of the present invention is, in view of the above circumstances, to provide an optical resin material the birefringence of which is kept at an acceptable level after injection or compression molding and which has such good dimensional stability that it does not warp or twist.

Further, the present invention intends to produce an ideal material as an optical resin material of an optical recording substrate or an optical lens which has substantially to birefringence and undeteriorated hygroscopicity and heat resistance from a resin material which has not been used as an optical material since it has a large birefringence even though it has good hygroscopicity, heat resistance and moldability.

Accordingly, the present invention provides an optical resin material comprising at least two constituent units each having positive and negative main polarizability differences of at least $50 \times 10^{-25}$ cm$^3$ in terms of absolute values.

As a result of the extensive study on a relationship between birefringence of a substrate made of a resin material and a chemical structure of the material, it has been found that birefringence of the substrate has no relationship with a photoelasticity constant of the resin material in a glass state as is well known, but has a relationship with an elastomeric photoelasticity constant of the resin material or a main polarizability difference derived from flow birefringence, that the material having a large absolute value of the main polarizability difference provides a substrate with a larger birefringence, and that a combination of a constituent unit having a positive main polarizability difference and one having a negative main polarizability difference can substantially extinguish the birefringence of the substrate.

The main polarizability difference herein used is related to a photoelasticity constant C based on a photoelasticity theory in an elastomeric region according to the following equation:

$$C = \frac{\Delta n_1}{\sigma} = \frac{2\pi}{45\,kT} \times \frac{(n_0^2 + 2)^2}{n_0} \times (\alpha_1 - \alpha_2)$$

wherein $\Delta n_1$: Main refractive index difference (difference between refractive index in a stress direction and that in a direction perpendicular thereto)

$n_0$: Average refractive index in an unstressed state $\alpha_1 - \alpha_2$: Main polarizability difference of statistical constituent units $k$: Boltzmann's constant $T$: Absolute temperature $\sigma$: Stress The relationship between the photoelasticity constant in the elastomeric state and the main polarizability difference is described in detail, for example, by Kuhn, Treloar et al in Kollid Z., 101, 248 (1942), and "Physics of Rubber Elasticity", Oxford Univ. Press (1949).

In the above equation, $(\alpha_1-\alpha_2)$ is measured according to a method described in "Kobunshi no Bussei" (Physical Properties of Polymers) II-Kobunshi Jikkengaku Koza (Polymer Experiment Course) 4-Kyoritsu Shuppan.

The main polarizability difference can be calculated from flow birefringence of a solution of a polymer:

$$\left[\frac{\Delta n_2}{g(\eta - \eta_0)}\right] = \frac{4\pi}{45\,kT} \times \frac{(m^2 + 2)^2}{m} \times (\alpha_1 - \alpha_2)$$

$$g \to 0$$

$$c \to 0$$

wherein
$\Delta n_2$: Birefringence of a solution
g: Velocity gradient
c: Concentration of a solution
$\eta$: Viscosity of a solution
$\eta_0$: Viscosity of a solvent
m: Refractive index of a solvent This measurement can be carried out according "Kobunshi no Bussei" (Physical Properties of Polymers) III-Kobunshi Jikkengaku Koza (Polymer Experiment Course) 5-Kyoritsu Shuppan.

The main polarizability difference of the constituent unit calculated from the elastomeric photoelasticity constant and that calculated from the flow birefringence have good coincidence with each other. The main polarizability differences of various polymers calculated from the flow birefringence are listed in, for example, "Polymer Handbook", Wiley Interscience (1975).

The measured values of the main polarizability difference slightly fluctuate. Therefore, the main polarizability difference used herein is that described in "Polymer Handbook", Wily Interscience (1975).

As described in the above, the main polarizability difference of the constituent unit herein used can be obtained as a main polarizability difference of a statistical constituent unit from the measurements of the elastomeric photoelasticity or the flow birefringence of a polymer comprising said constituent unit.

As the constituent unit having a positive main polarizability difference of an absolute value of at least $50 \times 10^{-25}$ cm$^3$ or a polymer comprising said unit, usually a constituent unit having an aromatic ring in its backbone chain is exemplified and includes, for example, aromatic polyester comprising terephthalic acid and an aliphatic dihydrocompound (e.g. polyethylene terephthalate), aromatic polycarbonate, aromatic polysulfone, aromatic polyether imide, aromatic polyimide and the like. As a non-aromatic constituent unit, exemplified are polyvinyl butyral, poly-N-alkyl maleimide, poly-N-alkyl citraconimide and the like.

As the constituent unit having a negative main polarizability difference of an absolute value of at least $50 \times 10^{-25}$ cm$^3$ or a polymer comprising said unit, exemplified are a unit having a freely rotatable aromatic ring in its backbone chain, for example, aromatic vinyl polymers (e.g. polystyrene, polyvinyltoluene), poly-N-phenyl-substituted maleimide, polyphenyl-substituted siloxane, poly-N-phenyl-substituted methacrylamide and the like, and a non-aromatic constituent unit such as a polymer of higher alkyl (meth)acrylate (e.g. cetyl methacrylate and octadecyl acrylate), poly-4-vinylpyridine, poly-$\beta$-vinylnaphthalene and the like.

A resin material consisting of a constituent unit having a main polarizability difference of at least $50 \times 10^{-25}$ cm$^3$ in terms of an absolute value cannot be used alone as an optical material since its birefringence is too large.

The resin material of the present invention includes a blend resin consisting of a resin comprising positive and negative constituent units each having a main polarizability difference of at least $50 \times 10^{-25}$ cm$^3$ in terms of the absolute value and a polymer comprising a constituent unit having a main polarizability difference of a small absolute value so that it hardly induces birefringence.

As the polymer having the main polarizability of small absolute value, alkyl poly(meth)acrylate having not more than 6 carbon atoms in the alkyl residue and a polymer comprising ethylene, propylene, isobutyrene, oxyethyelne and oxypropylene are useful.

According to the present invention, the resin material should contain at least two constituent units having the positive and negative main polarizability differences, respectively.

Namely, a resin material consisting of either one of the constituent units having a positive main polarizability difference or that having a negative main polarizability difference provides only a substrate having large birefringence. By changing the kind and proportion of the constituent unit having the negative main polarizability difference according to the kind and content of the constituent unit having a positive main polarizability difference, a substrate having substantially no birefringence can be made.

To prepare the resin material of the present invention, any preparation method can be employed provided that a phase separation structure of a tissue formed by each constituent unit is smaller than a diameter of the laser beam spot to be used for recording or reproducing information. For example, the following methods may be employed:

(1) random copolymerization of at least two of the above described monomers constituting the constituent units having the positive and negative main polarizability differences of at least $50 \times 10^{-25}$ cm$^3$ in terms of the absolute values, (2) block copolymerization of at least two of the above described monomers, or (3) graft copolymerization. In graft copolymerization, the kinds of the monomers constituting the constituent units having the positive and negative polarizability differences vary with that of the side chain in comparison with the molecular weight of the backbone chain.

When the molecular weight of each side chain is comparatively large in comparison with that of the backbone chain, the positive and negative constituents are combined according to the same concept as the random and block copolymerization. On the contrary, when the molecular weight of each side chain is considerably small, the side chain acts as a constituent unit having opposite negative or positive main polarizability difference.

Thus, when the backbone chain consists of the monomer which alone forms the constituting unit having the positive main polarizability difference or a polymer segment comprising monomers including said monomer, the combined side chains consists of the monomer which alone forms the constituting units having the positive main polarizability difference or a polymer segment comprising monomers including said monomer. On the contrary, when the backbone chain alone has negative main polarizability differences, the side chain alone having negative polarizability difference is combined. For this end, the backbone chain and the side chain may comprise the same monomer or different monomers.

The critical molecular weight of the side chain contained in the graft polymer varies with the kind of the monomer and is not uniquely determined. Rather, it is not necessary to determine such critical molecular weight of the side chain, but such critical weight can be easily determined by several trial and error experiments after choosing a specific molecular weight.

The resin material may be supplied in the form of a blend composition of a polymer comprising a monomer which alone provides the constituent unit having the positive main polarizability or plural monomers including said monomer and a polymer comprising a monomer which alone provides the constituent unit having the negative main polarizability or plural monomers including said monomer. In blending, the polymers are homogeneously mixed so as to minimize the phase separation structure of the tissue. It is preferred to add a small amount of a polymer which has affinity with both blended polymers as a compatibility improving agent.

Since the produced resin material should be transparent, preferably, refractive indexes of the polymer comprising the constituent unit having the positive main polarizability difference and that comprising the constituent unit having the negative main polarizability difference are substantially the same. Examples of such combination include a block copolymer of aromatic polycarbonate and styrene base polymer, a blend of aromatic polycarbonate and styrene base polymer, a copolymer comprising styrene/N-alkyl maleimide, a graft copolymer consisting of a backbone chain of methyl methacrylate/styrene copolymer and side chains of methyl methacrylate/styrene copolymer.

Evaluation of the resin produced as in the above can be carried out by measuring practically necessary birefringence rather than by measuring the main polarizability difference of the constituent unit. The birefringence varies with the processing conditions of the resin and a thickness of the resin article. Further, a required level of birefringence varies with its application as the optical material.

Therefore, a proportion of at least two constituent units of the optical resin material according to the present invention may be adjusted so as to meet the requirements for each application. A performance generally required for the optical material is that birefringence is not larger than 100 nm at a thickness of 1.2 mm irrespective of the processing conditions.

Generally, light passes through the optical material. Since before and after light passing, more or less heat is generated, the material is required to be heat resistance to some extent. A criterion for this is a glass transition temperature of 70° C. or higher. Since the material warps or deforms due to moisture absorption, preferably the resin material has low water absorbance, particularly, 1.8% or less of water absorbance.

The resin material of the present invention should satisfy the above requirements.

For this end, preferably at least one, more preferably both of the consituent units having the positive and negative main polarizability differences of at least $50 \times 10^{-25}$ cm$^3$ in terms of the absolute values contain aromatic rings.

As a molding method for forming the substrate from the resin material of the present invention, injection, compression and injection-compression molding are exemplified. Among them, in a molding method by which larger birefringence is induced, the effect of the present invention is significantly demonstrated. In view of productivity, injection molding is most preferred.

In case of producing the substrate by injection molding, since minute patterns of a stamper should be precisely transferred to the substrate, preferably the resin has lower melt viscosity. Therefore, the molding temperature is optimized, or the molecular weight is adjusted in a range in which the heat resistance, mechanical strength and the like of the resin are not adversely affected.

EXAMPLES

The present invention will be illustrated by following examples, which do not limit the scope of the present invention. In the examples, parts and % are by weight unless otherwise indicated.

Physical properties shown in examples are measured as follows:

Birefringence

By means of a polarization microscope, retardation is measured at 546 nm according to a Cenarmon compensator method. Birefringence of a resin sample is measured by placing the sample between a pair of polarization films each adhered with a quarter-wave plate.

Water absorbance

According to ASTM D-570, equilibrium water absorption is measured in distilled water at 23° C.

Melt index

According to ASTM D-1238, melt index is measured at 230° C. under a load of 3,800 g.

EXAMPLE 1

By using a mixture of metal sodium and α-methylstyrene as an anionic polymerization initiator, a solution of the initiator in tetrahydrofuran was prepared according to a per se conventional method. By using this solution and toluene as a solvent, styrene was anionically polymerized at 0° C., and a resulting solution of living polystyrene was reacted with an excess amount of phosgene to obtain polystyrene terminated with acid chloride having a molecular weight of 3,800. After evaporating phosgene off, the polymer solution was reacted with an excess amount of Bisphenol-A to replace the terminal group with phenol followed by injection of phosgene to proceed with polymerization to obtain polystyrene/polycarbonate block copolymer containing 30% of polystyrene and having $\eta_{sp/c}$ of 0.45 (0.5% solution in chloroform, 25° C.). Water absorbance, 0.35%. Glass transition temperature, 125° C.

Immediately after melting the copolymer at 300° C., it was cooled under pressure of 100 kg/cm$^3$ to form a disc sample of 0.5 mm in thickness and about 8 cm in outer diameter. For measuring birefringence of the sample, it was placed between a pair of polarized films and observed, but birefringence was hardly observed.

COMPARATIVE EXAMPLE 1

According to the description of Shnell, "Chemistry & Physics of Polycarbonates", 39 (1964), John Wiley & Sons Inc., Bisphenol-A was interfacially polycondensated by using p-tert-butylphenol as a chain transfer agent to obtain polycarbonate resin having $\eta_{sp/c}$ of 0.41. The resin was melt and pressed with cooling under the same conditions as in Example 1 to form a disc sample. Birefringence of the sample was observed in the same manner as in Example 1 to find that birefringence was observed on the whole sample.

EXAMPLE 2

The polycarbonate resin prepared in the same manner as in Comparative Example 1 (main polarization difference: $110 \times 10^{-25}$ cm$^3$), as a styrene-base resin, styrene/maleic anhydride copolymer (main polarization difference: $-120 \times 10^{-25}$ cm$^3$) (Dailark #232 (trade mark) manufactured by Alco) and, as a compatibility improving agent, the block copolymer as prepared in Example 1 were melt blended in proportions shown in Table 1 to obtain a molding resin material. The resulting resin material was injection molded at a cylinder temperature of 310° C. and a mold temperature of 100° C. to form a transparent disc sample of 100 mm in diameter and 1.2 mm in thickness.

Birefringence and water absorbance of the disc were measured at a part 2.5 cm apart from the center. The results are shown in Table 1.

The disc made of the resin material of the present invention has low birefringence and low water absorption. Table 1 shows the absolute value of the measured birefringence. The negative or positive sign of the birefringence of Examples 2-1, 2-2 and Example 2-3 was reversed.

TABLE 1

| | Amount (parts) | | | Bire- fringence (nm) | Water absor- bance (%) | Glass transition temperature (°C.) |
|---|---|---|---|---|---|---|
| | Polycarbo- nate resin | Styrene-base resin | Block copolymer | | | |
| Example 2-1 | 80 | 20 | 5 | 42 | 0.38 | 135 |
| Example 2-2 | 70 | 30 | 10 | 19 | 0.36 | 133 |
| Example 2-3 | 60 | 40 | 15 | 28 | 0.32 | 128 |
| Com. Ex. 2-1 | 100 | — | — | 120 | 0.42 | 137 |
| Com. Ex. 2-2 | — | 100 | — | 200< | 0.23 | 123 |

COMPARATIVE EXAMPLE 2

Each of the resins used in Example 2 was used without blending to form a disc sample by injection molding under the same condition, and its birefringence was measured at a part 2.5 cm apart from the center. The results are shown in Table 1.

EXAMPLE 3

A monomeric mixture of 45 parts of methyl methacrylate (main polarization difference of a homopolymer, $+2.0 \times 10^{-25}$ cm$^3$), 22 parts of styrene ($-145 \times 10^{-25}$ cm$^3$) and 33 parts of n-butylmaleimide ($+150 \times 10^{-25}$ cm$^3$) was suspension polymerized in the presence of a radical initiator to obtain a copolymer. Glass transition temperature, 110° C. Water absorbance, 0.85%. Melt index, 3.0.

The resulting resin material was injection molded at a cylinder temperature of 270° C. and a mold temperature of 60° C. to form a disc of 200 mm in diameter and 1.20 mm in thickness carrying informations on its one side.

Its birefringence was measured at a part 6 cm apart from the center and found to be as low as 19 nm.

COMPARATIVE EXAMPLE 3

A monomeric mixture of 78 parts of methyl methacrylate and 22 parts of styrene was suspension polymerized in the same manner as in Example 3 to obtain a copolymer. Glass transition temperature, 102° C. Water absorbance 1.4%. Melt index 5. Under the same conditions as in Example 3, a disc of 200 mm in diameter was injection molded. Its birefringence at a part 6 cm apart from the center was measured and found to be as high as 130 nm.

EXAMPLE 4

A monomeric mixture of 45 parts of methyl methacrylate and 55 parts of styrene added with thioglycolic acid as a chain transfer agent was bulk polymerized in the presence of azobisisobutyronitrile as an initiator to obtain an oligomer having a molecular weight of about 2,000 after purification by reprecipitation. The resulting oligomer was dissolved in xylene and added with glycidyl methacrylate in an amount of 1.3 times equivalent of carboxyl groups contained in the oligomer, a catalytic amount of N,N-dimethyldodecylamine and a trace amount of a radical polymerization inhibitor. Then, the mixture was reacted at 120° C. for 5 hours and purified by reprecipitation to obtain a methyl methacrylate/styrene copolymer having vinyl groups at chain ends.

A monomeric mixture of 40 parts of the oligomer, 25 parts of methyl methacrylate and 35 parts of styrene was radically bulk polymerized to obtain a graft copolymer. Glass transition temperature, 100° C. Water absorbance 0.60%. Melt index 9.

Immediately after melting a part of the copolymer at 270° C., it was cooled under pressure of 100 kg/cm$^3$ to form a disc sample of 0.5 mm in thickness and about 8 cm in outer diameter. For measuring birefringence of the sample, it was placed between a pair of polarized films and observed, but birefringence was hardly observed.

COMPARATIVE EXAMPLE 4

A monomeric mixture of 45 parts of methyl methacrylate and 55 parts of styrene was bulk polymerized to obtain a copolymer with melt index of 10. The copolymer was melt and pressed with cooling under the same conditions as in Example 4 to form a disc sample. It was observed between a pair of a polarized films. Birefringence was observed on the whole samples and the copolymer was inferior to that of Example 4.

What is claimed is:

1. An optical resin material which comprises at least one constituent unit having positive main polarizability difference, and at least one constituent unit having negative main polarizability difference, and wherein said constituent units have main polarizability differences of at least $50 \times 10^{-25}$ cm$^3$ in terms of absolute values.

2. The optical resin material according to claim 1, wherein the resin comprises at least two constituent units each having positive and negative main polarizability differences of at least $50 \times 10^{-25}$ cm$^3$ in terms of absolute values and has a birefringence not larger than 100 nm at a thickness of 1.2 mm.

3. The optical resin material according to claim 1, wherein the resin comprises a copolymer comprising a constituent unit having a positive main polarizability difference of at least $50 \times 10^{-25}$ cm$^3$ in terms of an absolute value and a constituent unit having a negative main polarizability difference of at least $50 \times 10^{-25}$ cm$^3$ in terms of an absolute value.

4. The optical resin material according to claim 1, wherein the resin comprises a composition containing a resin consisting of a constituent unit having a positive main polarizability difference of at least $50 \times 10^{-25}$ cm$^3$ in terms of an absolute value and a resin consisting of a constituent unit having a negative main polarizability difference of at least $50 \times 10^{-25}$ cm$^3$ in terms of an absolute value.

5. The optical resin material according to claim 1, wherein the resin has water absorbance of 1.8% or less.

6. The optical resin material according to claim 1, wherein the resin has a glass transition temperature not lower than 70° C.

7. A transparent optical resin material which comprises an aromatic polycarbonate as a constituent unit having positive main polarizability difference, and an aromatic vinyl polymer as a constituent unit having negative main polarizability difference, and wherein said constituent units have main polarizability differences of at least $50 \times 10^{-25}$ cm$^3$ in terms of absolute values.

8. The optical resin material according to claim 7, wherein said aromatic vinyl polymer is a polystyrene.

* * * * *